United States Patent [19]

Weiner

[11] 4,244,719

[45] Jan. 13, 1981

[54] METHOD AND APPARATUS FOR DISTRIBUTING MINERAL FIBERS

[75] Inventor: George R. Weiner, San Jose, Calif.

[73] Assignee: Owens-Corning Fiberglas Corporation, Toledo, Ohio

[21] Appl. No.: 107,300

[22] Filed: Dec. 26, 1979

[51] Int. Cl.³ ............................................. C03B 37/04
[52] U.S. Cl. ................................................ 65/4 R; 65/9; 65/14; 65/16; 156/62.4
[58] Field of Search ......................... 65/4 R, 9, 6–8, 65/14–16; 156/62.4

[56] References Cited

U.S. PATENT DOCUMENTS

| | | | |
|---|---|---|---|
| 2,863,493 | 12/1958 | Snow | 156/62.4 |
| 3,030,659 | 4/1962 | Slayter | 65/14 |
| 4,061,485 | 12/1977 | Rimmel | |

FOREIGN PATENT DOCUMENTS

| | | | |
|---|---|---|---|
| 860695 | 12/1952 | Fed. Rep. of Germany | 65/16 |
| 392014 | 1/1974 | U.S.S.R. | 65/16 |

*Primary Examiner*—Robert L. Lindsay, Jr.
*Attorney, Agent, or Firm*—Ronald C. Hudgens; Philip R. Cloutier; Ted C. Gillespie

[57] ABSTRACT

Apparatus for deflecting a veil (16) of mineral fibers includes an elongated nozzle (24) having a manifold chamber (30) and a discharge conduit (32), the discharge conduit (32) being adapted to discharge a substantially non-turbulent flow of gases, an airfoil-shaped cross section to enable a substantially non-turbulent flow of induced air, and means (26) outside the path of the induced air for introducing gases into the manifold chamber (30).

15 Claims, 4 Drawing Figures

METHOD AND APPARATUS FOR DISTRIBUTING MINERAL FIBERS

TECHNICAL FIELD

This invention relates to distributing mineral fibers onto a collection surface to form a uniformly collected pack of mineral fibers, such as glass fibers. In one of its more specific aspects, this invention relates to deflecting a cylindrical veil of mineral fibers to form a uniformly distributed pack of the mineral fibers.

BACKGROUND OF THE INVENTION

A common method for forming mineral fibers involves supplying molten mineral material to a centrifuge having a plurality of holes in its peripheral wall, and centrifuging the mineral material through the peripheral wall to form fibers. The fibers can be further attenuated with a blower or a combustion chamber burner, or can be merely deflected downwardly by a non-attenuating blower to form a generally cylindrical veil of fibers. It is desirable to distribute the fibers uniformly across the width of the collecting surface, and it is a common practice to utilize nozzles emitting air or steam blasts to periodically deflect the veil for distribution of the fibers into a wider pack. It is known that a pair of opposed nozzles can be positioned to periodically discharge gases to divide the veil into two or more principal fiber flows in order to uniformly distribute the fibers. It is also known that the nozzles for deflecting the veil can be elongated with the long side having a discharge opening for directing gases toward the veil.

One of the problems associated with the nozzles of such veil deflecting systems is that considerable amounts of energy are required for operation. The energy required can amount to a substantial portion of the total energy required for the entire fiber forming and fiber distributing system.

The present invention is directed toward a system for deflecting a veil of mineral fibers in which the energy consumed by the nozzles is substantially reduced. The present invention also substantially increases the deflecting force of the gases emitted from the nozzle by discharging the gases in a substantially non-turbulent state. The present invention also substantially reduces the turbulence in the induced air flowing past the nozzle, and such reduced turbulence lowers the noise levels.

SUMMARY OF THE INVENTION

According to this invention there is provided a system for deflecting a veil of mineral fibers comprising an elongated nozzle having a air-foil shaped cross section to enable a substantially non-turbulent flow of induced air past the nozzle, a manifold chamber extending throughout the length of the nozzle, a discharge conduit leading from the manifold chamber to the downstream side of the nozzle, the discharge conduit being adapted to discharge a substantially non-turbulent flow of gases, and means for introducing gases into the manifold chamber, the means being positioned outside the path of the induced air.

In a preferred embodiment, the means for introducing gases into the manifold chamber is positioned at the end of the nozzle.

In another preferred embodiment, the nozzle of the invention is generally rectangular in a plane substantially parallel to the discharge conduit.

In another preferred embodiment, the discharge conduit opens into the manifold chamber for substantially the entire length of the nozzle.

In the most preferred embodiment, a portion of the downstream side of the external surface of the nozzle is concave.

According to this invention, there is also provided a system for deflecting a veil of mineral fibers comprising an elongated nozzle having a manifold chamber throughout the length of the nozzle, a discharge conduit leading from the manifold chamber to the downstream side of the nozzle, the discharge conduit communicating with the manifold chamber throughout the length of the nozzle, and the discharge conduit being defined by two substantially parallel surfaces to discharge a substantially non-turbulent flow of gases, an air-foil shaped cross section to enable a substantially non-turbulent flow of induced air past the nozzle, and means for introducing gases into the manifold chamber, the means being positioned at the end of the nozzle.

In a preferred embodiment of the invention, the width of the discharge conduit is greater than the width of the manifold chamber.

According to this invention, there is also provided an elongated nozzle comprising a manifold chamber throughout the length of the nozzle, a dischage conduit leading from the manifold chamber to the downstream side of the nozzle, the discharge conduit being adapted to discharge a substantially non-turbulent flow of gases, and means for introducing gases into the manifold chamber, the means being positioned outside the path of the induced air, the nozzle having a air-foil shaped cross section to enable a substantially non-turbulent flow of induced air past the nozzle.

In a preferred embodiment of the invention, the means for introducing gases is positioned at the end of the nozzle.

In another preferred embodiment of the invention, the nozzle is generally rectangular in a plane substantially parallel to the discharge conduit.

In another preferred embodiment of the invention, the discharge conduit opens into the manifold chamber for substantially the entire length of the nozzle.

In yet another preferred embodiment of the invention, the width of the discharge conduit is greater than the width of the manifold chamber.

In a most preferred embodiment of the invention, a portion of the external surface of the downstream side of the nozzle is concave.

DESCRIPTION OF THE INVENTION

Figure 1:
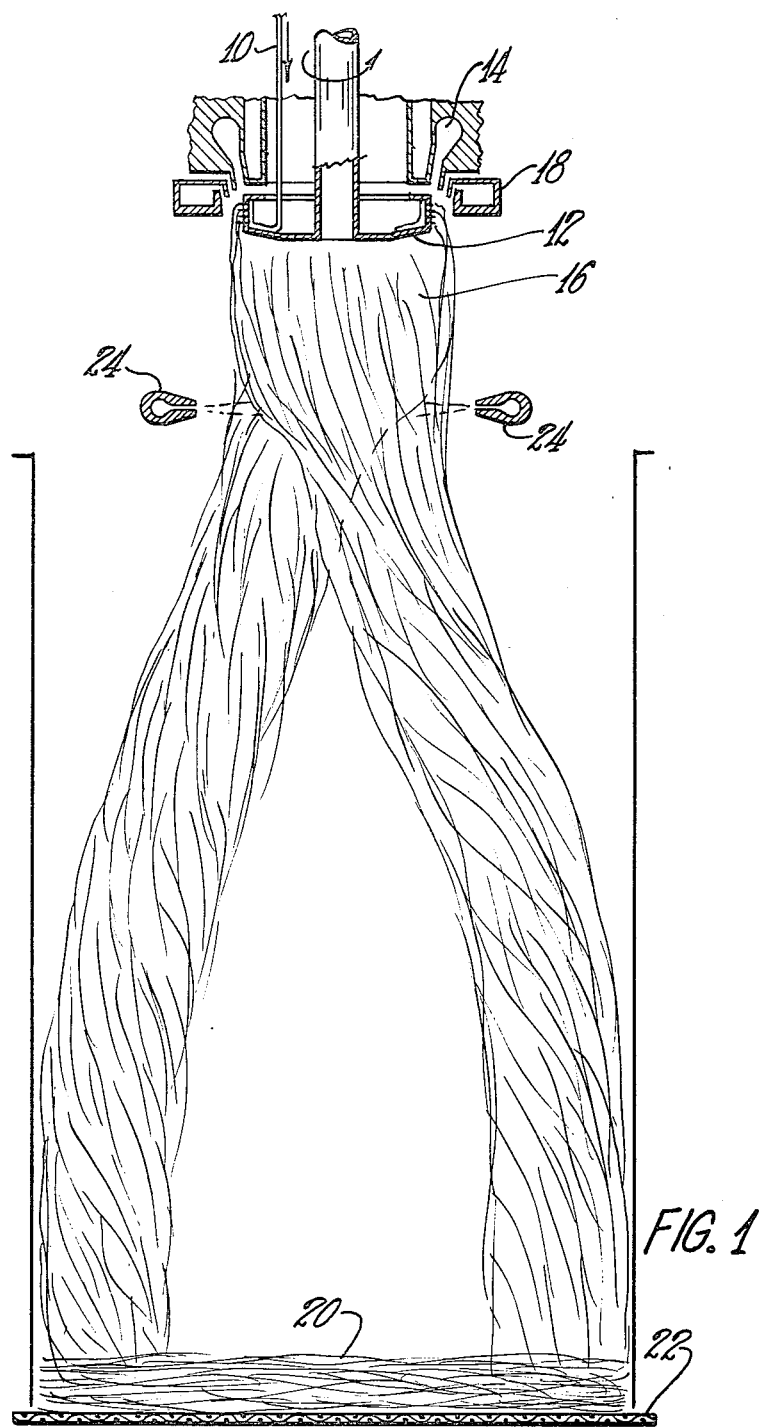
FIG. 1 is a schematic view in elevation of apparatus for deflecting a veil of mineral fibers according to the principles of this invention.

As shown in FIG. 1, molten mineral material such as molten glass 10 is delivered to rotating spinner 12 which fiberizes the glass by centrifugal force. The glass fibers can be maintained in a plastic, attenuable state by annular burner 14. The glass fibers can be turned down into cylindrical veil 16 by annular blower 18. The veil collects as insulation pack 20 on collecting surface 22, which can be a continuous, foraminous conveyor belt. Nozzles 24 are activated periodically to deflect some or all of the veil to uniformly distribute the veil across the width of the collecting surface.

Figure 2:
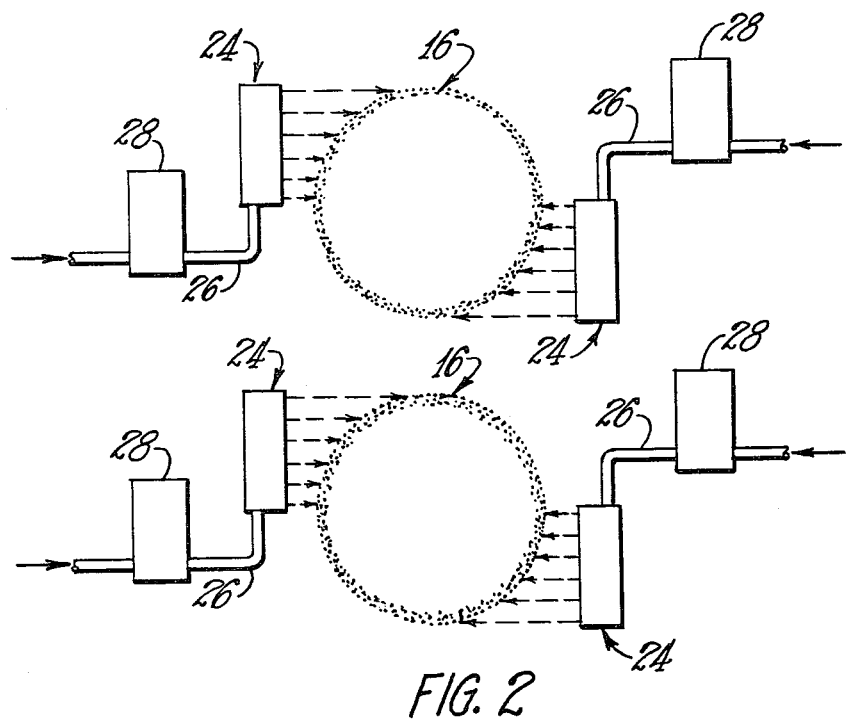
FIG. 2 is a schematic plan view of the system for deflecting two veils of mineral fibers according to the principles of the invention.

As shown in FIG. 2, the nozzles can be arranged so that a pair of opposed nozzles is adapted to act upon each veil of a multi-veil fiber forming and fiber distribution system. The arrows indicate the direction of flow of gases from downstream side 40 of each nozzle. The nozzles can be supplied with air, steam or other gases via supply conduits 26, which can receive the supply of gases from a source, not shown. The supply conduits can be adapted with accumulators 28 to dampen the effect of the pulsation of the gases from the source of the gases.

Figure 3:
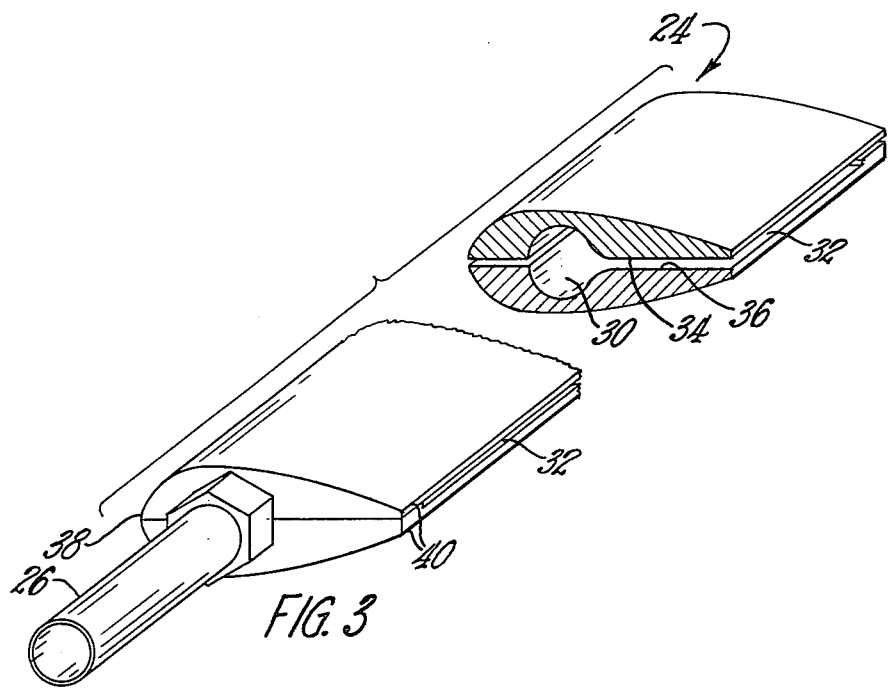
FIG. 3 is a schematic cutaway perspective view of the nozzle according to the principles of this invention.
Figure 4:
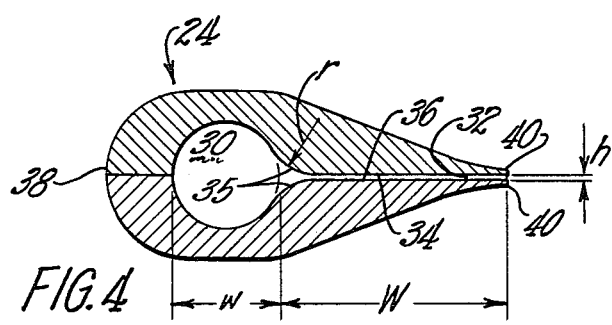
FIG. 4 is a schematic elevational view of the air-foil shaped cross section of the nozzle of FIG. 3.
Figure 1:
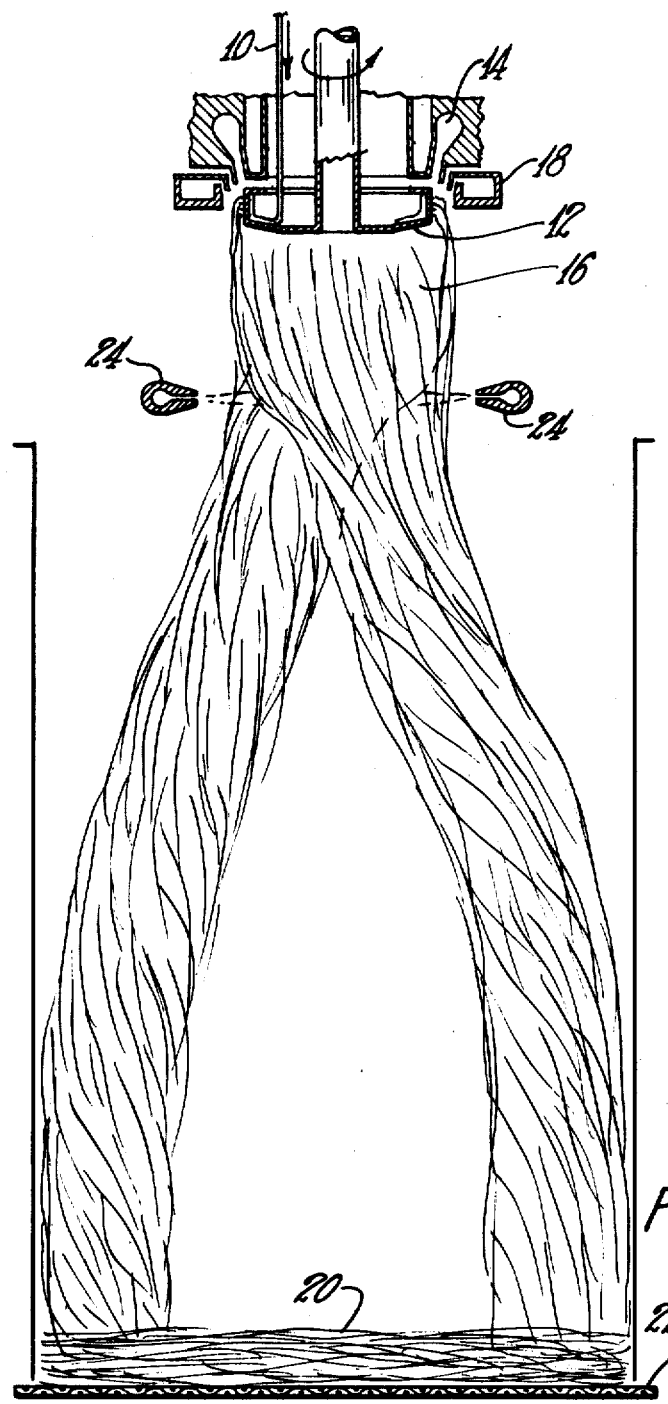
Figure 2:
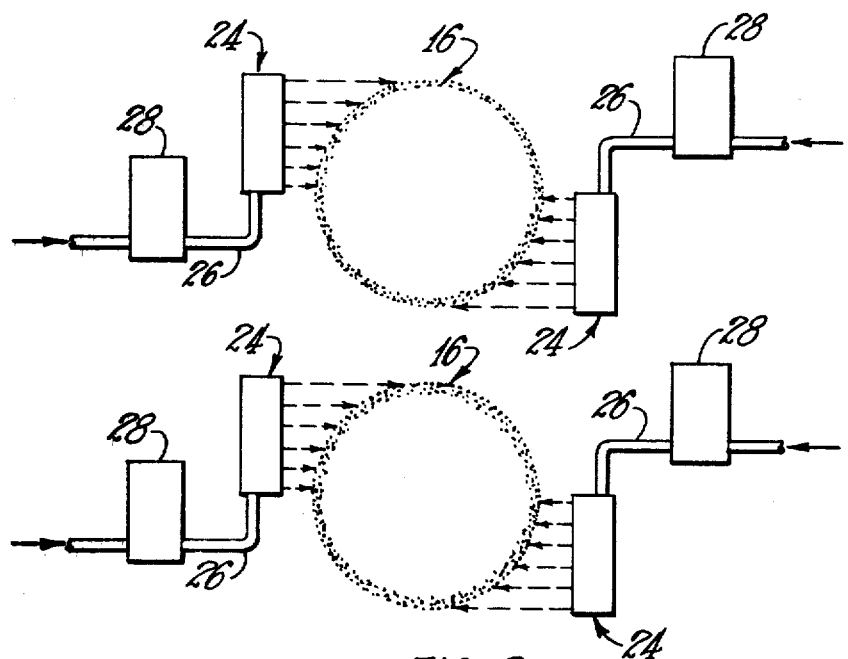
Figure 3:
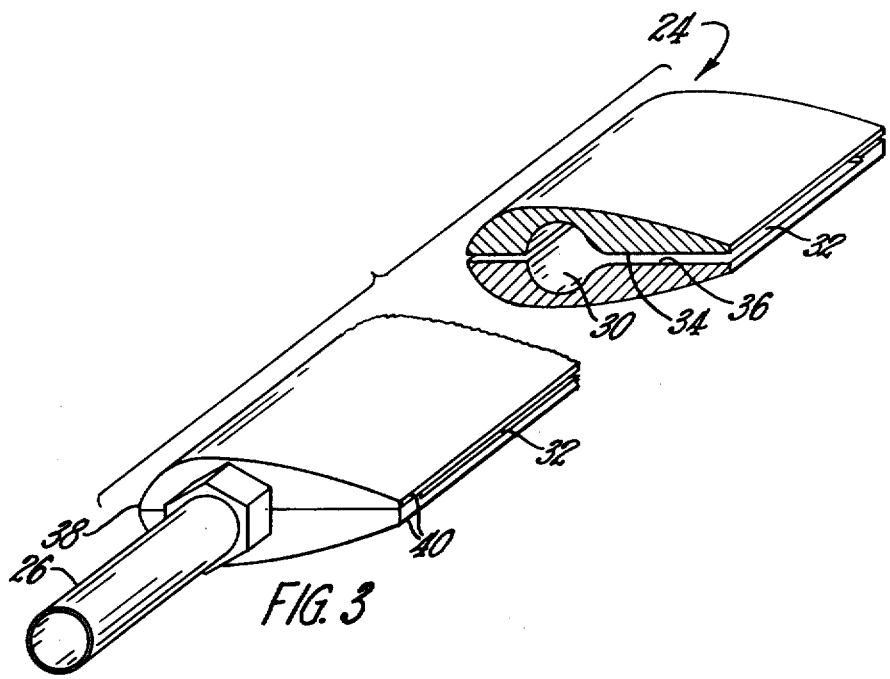
Figure 4:
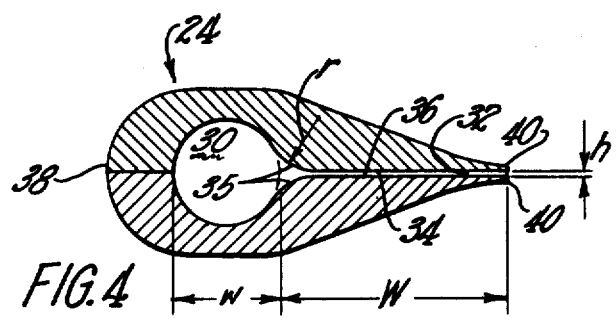

As shown in FIGS. 3 and 4, the nozzle is adapted with manifold chamber 30 which receives gases from the supply conduit and distributes them along the length of the nozzle into discharge conduit 32. The manifold chamber can be adapted with a parabolic-shaped cross section to facilitate streamlined flow. The discharge conduit can be in open communication with the manifold chamber throughout the entire length of the nozzle. The discharge conduit can be defined by two generally parallel surfaces, such as upper surface 34 and lower surface 36, separated by a height h. To facilitate streamlined or non-turbulent air flow from the manifold chamber to the discharge conduit, the upper and lower surfaces can be adapted with curved or arcuate surfaces 35, each having a radius r, which can be equal to or greater than W/2.

As shown in FIG. 4, the width W of the discharge conduit is relatively long compared with the width w of the manifold chamber. The discharge conduit can have a width/height ratio (W/h) of approximately 20. The relatively wide (width W), and thin (height h) discharge conduit provides a substantially straight and laminar flow of gases for discharge from the nozzle.

The discharge of the flow of gases from the nozzle causes air to be induced to flow both above and below the nozzle. The nozzle has an air-foil shaped cross section to enable a streamlined or substantially non-turbulent flow of induced air past the nozzle. To facilitate the smoothest flow of air, the leading or upstream side 38 of the nozzle has a convex surface, and the downstream side is adapted with concave surfaces. In order to not disturb the generally non-turbulent flow of induced air past the nozzle, the supply conduit is connected to the manifold chamber at the end of the nozzle.

As can be seen in FIGS. 2 and 3, the nozzle is generally rectangular in a plan view, i.e., in a plane substantially parallel to the plane of the discharge conduit.

A nozzle for use in a system for deflecting a veil of glass fibers according to the principles of this invention was compared with conventional nozzles in a laboratory test. The resulting air consumption was reduced by 38%, and the resulting noise level was reduced from 107 db to 97 db, while maintaining the same average exit velocity. Thus, it can be seen that employment of the invention substantially reduces energy consumption and noise pollution.

EXPLOITATION IN INDUSTRY

This invention will be found to be useful in the formation of fibers from molten glass for such uses as glass fiber thermal insulation products and glass fiber acoustical insulation products.

I claim:

1. In a system for deflecting a veil (16) of mineral fibers means for forming a mineral fiber veil and, an elongated nozzle (24), the improvement comprising:
   a manifold chamber (30) extending throughout the length of said nozzle (24);
   a discharge conduit (32) leading from said manifold chamber (30) to the downstream side (40) of said nozzle (24), said discharge conduit (32) being adapted to discharge a substantially non-turbulent flow of gases; and
   means (26) for introducing gases into said manifold chamber (30), said means (26) being positioned outside the path of the induced air;
   said nozzle having an airfoil-shaped cross section to enable a substantially non-turbulent flow of induced air past said nozzle (24).

2. The apparatus of claim 1 in which said means (26) is positioned at the end of said nozzle (24).

3. The apparatus of claims 1 or 2 in which said nozzle (24) is generally rectangular in a plane substantially parallel to said discharge conduit (32).

4. The apparatus of claims 1 or 2 in which said discharge conduit (32) opens into said manifold chamber (30) for substantially the entire length of said nozzle (24).

5. The apparatus of claims 1 or 2 in which a portion of the external surface of the downsteam side (40) of said nozzle (24) is concave.

6. In a system for deflecting a veil (16) of mineral fibers in combination with means to form a mineral fiber veil and, an elongated nozzle (24) the improvement comprising:
   a manifold chamber (30) throughout the length of said nozzle (24);
   a discharge conduit (32) leading from said manifold chamber (30) to the downstream side (40) of said nozzle (24), said discharge conduit (32) communicating with said manifold chamber (30) throughout the length of said nozzle (24), and said discharge conduit (32) being defined by two substantially parallel surfaces (34, 36) to discharge a substantially non-turbulent flow of gases; and
   means (26) for introducing gases into said manifold chamber (30), said means (26) being positioned at the end of said nozzle (24);
   said nozzle having an airfoil-shaped cross section to enable a substantially non-turbulent flow of induced air past said nozzle (24).

7. The apparatus of claim 6 in which said nozzle (24) is generally rectangular in a plane substantially parallel to said surfaces (34,36).

8. The apparatus of claim 6 in which the width (W) of said discharge conduit (32) is greater than the width (W) of said manifold chamber (30).

9. The apparatus of claim 8 in which a portion of the external surface of the downstream side (40) of said nozzle (24) is concave.

10. An elongated nozzle (24) in combination with means to form a mineral fiber veil, said elongated nozzle comprising:

a manifold chamber (30) throughout the length of said nozzle (24);

a discharge conduit (32) leading from said manifold chamber (30) to the downstream side (40) of said nozzle (24), said discharge conduit (32) being adapted to discharge a substantially non-turbulent flow of gases; and means (26) for introducing gases into said manifold chamber (30), said means (26) being positioned outside the path of the induced air;

said nozzle having an airfoil-shaped cross section to enable a substantially non-turbulent flow of induced air past said nozzle (24).

11. The apparatus of claim 10 in which said means (26) is positioned at the end of said nozzle (24).

12. The apparatus of claim 11 in which said nozzle (24) is generally rectangular in a plane substantially parallel to said discharge conduit (32).

13. The apparatus of claim 12 in which said discharge conduit (32) opens into said manifold chamber (30) for substantially the entire length of said nozzle (24).

14. The apparatus of claim 13 in which the width (W) of said discharge conduit (32) is greater than the width (W) of said manifold chamber (30).

15. The apparatus of claim 14 in which a portion of the external surface of the downstream side (40) of said nozzle (24) is concave.

* * * * *

UNITED STATES PATENT AND TRADEMARK OFFICE
CERTIFICATE OF CORRECTION

PATENT NO. : 4,244,719
DATED : January 13, 1981
INVENTOR(S) : George R. Weiner

It is certified that error appears in the above—identified patent and that said Letters Patent is hereby corrected as shown below:

The three sheets of drawings should be deleted to appear as per attached. This correction applys to the Grant only.

Col. 1, line 56 should read:
   elongated nozzle having an air-foil shaped cross section Col. 4, line 31: "hcarge" should be changed to "charge"

Col. 4, line 35: "downsteam" should be changed to "downstream"

Col. 4, line 62: "(W)" should be changed to "(w)"

Col. 6, line 11: "(W)" should be changed to "(w)"

Signed and Sealed this

Twenty-first Day of April 1981

[SEAL]

Attest:

RENE D. TEGTMEYER

Attesting Officer     Acting Commissioner of Patents and Trademarks